(12) United States Patent
Zahornacky et al.

(10) Patent No.: US 8,901,770 B2
(45) Date of Patent: Dec. 2, 2014

(54) ADJUSTABLE TRANSFORMER FOR A MODEL VEHICLE

(75) Inventors: Jon F. Zahornacky, Santa Clara, CA (US); Neil Young, Woodside, CA (US)

(73) Assignee: Lionel LLC, Concord, NC (US)

( * ) Notice: Subject to any disclaimer, the term of this patent is extended or adjusted under 35 U.S.C. 154(b) by 918 days.

(21) Appl. No.: 13/037,269

(22) Filed: Feb. 28, 2011

(65) Prior Publication Data

US 2012/0217804 A1  Aug. 30, 2012

(51) Int. Cl.
*H02J 1/10* (2006.01)
*A63H 19/24* (2006.01)

(52) U.S. Cl.
CPC ..................... *A63H 19/24* (2013.01)
USPC ............ 307/43; 307/81; 307/125; 307/140; 105/26.05; 105/157.2

(58) Field of Classification Search
CPC .......................................................... H02J 3/04
USPC ............................................................. 307/43
See application file for complete search history.

(56) References Cited

U.S. PATENT DOCUMENTS

| | | | |
|---|---|---|---|
| 6,624,537 B2* | 9/2003 | Westlake | 307/125 |
| 7,312,790 B2* | 12/2007 | Sato et al. | 345/173 |
| 2006/0071620 A1* | 4/2006 | Zahornacky | 318/53 |
| 2010/0261530 A1* | 10/2010 | Thomas et al. | 463/36 |
| 2011/0270219 A1* | 11/2011 | Friedli | 604/506 |

* cited by examiner

*Primary Examiner* — Rexford Barnie
*Assistant Examiner* — Toan Vu
(74) *Attorney, Agent, or Firm* — Fitzsimmons IP Law (57) ABSTRACT

A system and method is provided for powering and/or controlling a plurality of model devices, including at least one model vehicle. In one embodiment of the present invention, the system includes an adjustable transformer in communication with at least a model train. The adjustable transformer is configured to convert an AC voltage into first and second AC output voltages based, respectively, on positions of first and second input devices. The adjustable transformer includes a processor configured to receive input signals from the input devices, and to generate corresponding control signals, which are used by drive circuits to convert an AC voltage into first and second outputs. The processor is further configured to display data concerning the first output on a display, and to replace the data concerning the first output with data concerning the second output if a signal is received from a sensor, indicating that the user has interacted with the second input device.

14 Claims, 8 Drawing Sheets

ADJUSTABLE TRANSFORMER FOR A MODEL VEHICLE

BACKGROUND OF THE INVENTION

1. Field of the Invention

The present invention relates to model devices, or more particularly, to a system and method of powering and/or controlling a plurality of model devices, including at least one model vehicle.

2. Description of Related Art

For millions of consumers, operating a model device, such as a model train, is a form of entertainment. Traditionally, model devices are powered by transformers, converting conventional power (e.g., 120 volts AC) into powers suitable for model devices (e.g., 18 volts AC), and controlled by controllers. The controllers can be used to generate a particular effect (e.g., sound effect, visual effect, etc.).

For example, in powering a model train system that includes both a model train and a model train accessory, a dual-output transformer may be used to provide power to both the model train and the accessory, and a controller may be used to provide sound and/or direction commands to the model train. These conventional devices, however, are insufficient to properly power and control more than two model train devices. Further, these devices may not accurately simulate what one would experience in operating an actual train. For example, many conventional transformers do not include controls that are similar to throttles found on actual trains.

Further, most transformers do not provide feedback to the user on the operation of the transformer. For example, most transformers do not include a display, and therefore cannot display data associated with the output (e.g., voltage, current, etc.). And for those transformers that do include a display, there is generally insufficient space to show data associated with each output. This is especially true if the transformer includes more than two outputs.

Thus, it would be advantageous to provide a variable transformer for operating a plurality of model devices that includes both realistic controls and at least one display for providing data (e.g., voltage, current, etc.) on each output.

SUMMARY OF THE INVENTION

The present invention provides a system and method for powering and/or controlling a plurality of model devices, including at least one model vehicle. Preferred embodiments of the present invention operate in accordance with an adjustable transformer in communication with a model train system.

In one embodiment of the present invention, the adjustable transformer is configured to power a model train accessory and a model train operating on a model train track. The adjustable transformer includes a first input connected to a power source, a first output connected to the model train track, and a second output connected to the model train accessory. The adjustable transformer includes a fixed transformer for converting a first AC voltage (e.g., 120 volts) into a second AC voltage (e.g., 18 volts), wherein the second AC voltage is provided to a first output drive circuit, a second output drive circuit, and a processor. The processor is in communication with the first output drive circuit, the second output drive circuit, a first input device, and a second input device. The first and second input devices are movable between a plurality of positions. In one embodiment of the present invention, the second input includes a sensor, which is in communication with the processor. The sensor is configured to send a signal to the processor if a user is interacting with the second input device. For example, the sensor may sense when a user touches the second input device, or when the second input device has been moved between first and second positions.

As discussed above, the processor is configured to communicate with the first and second input devices. In particular, the first and second input devices are configured to send first and second input signals to the processor, wherein the first and second input signals are based on positions of the first and second input devices. The processor is then configured to use the first and second input signals to control the first and second output drive circuits. Specifically, the processor is configured to use the first input signal to generate a first control signal, which is provided to the first output drive circuit, and use the second input signal to generate a second control signal, which is provided to the second output drive circuit. The first output drive circuit is then configured to convert the second AC voltage into a first output, having a first AC output voltage that corresponds to the first control signal. Similarly, the second output drive circuit is configured to convert the second AC voltage into a second output, having a second AC output voltage that corresponds to the second control signal.

The processor may further be configured to display data concerning the first and second outputs on the display. For example, in one embodiment of the present invention, the processor is configured to display a first set of data on the display, and to replace the first set of data with a second set of data if a signal is received from the sensor, indicating that the user has interacted with the second input device. In accordance with this embodiment, the first set of data includes voltage and/or current associated with the first output, and the second set of data includes voltage and/or current associated with the second output. The processor may then be configured to replace the second set of data with the first set of data if either the processor has not received a signal from the sensor during a predetermined period of time, indicating that the user is not longer interacting with the second input device, or the processor receives a signal from a second sensor, indicating that the user is interacting with the first input device.

In accordance with another embodiment of the present invention, the adjustable transformer may further include at least one button that can be pushed to generate either a bell sound, a whistle sound, or a change-direction instruction. Specifically, in response to the button being pressed, the processor may be configured to add a DC offset to the output, indicating that either a bell or a whistle sound should be played. Alternatively, in response to the button being pressed, the processor may be configured to send a change-direction instruction to an attached model train, indicating a change in the train's operating state.

A more complete understanding of a system and method for powering and controlling a plurality of model devices will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a system and method for powering and/or controlling a plurality of model devices, including at least one model vehicle. In the detailed description that follows, like element numerals are used to describe like elements illustrated in one or more figures. It should be appreciated that while the present invention is described herein in terms of a model train system, including both a model train and a model train accessory, the invention is not so limited. For example, the invention could be used to power and/or control a plurality of model trains, a plurality of model train accessories, any combination of the same, or any other model device.

Figure 1:
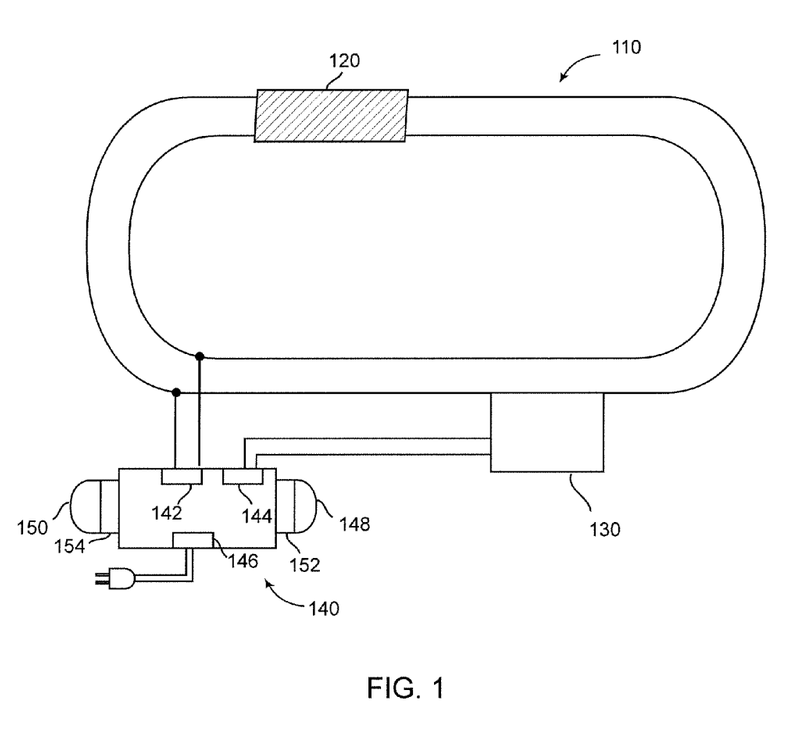
FIG. 1 illustrates a model train system in accordance with one embodiment of the present invention, wherein the model train system includes a variable transformer, a model train, and a model train accessory.

In one embodiment of the present invention, an adjustable transformer is connected to a model train system. As shown in FIG. 1, the model train system includes a model train track 110, a model train 120 operating on the model train track 110, and a model train accessory 130. An adjustable transformer 140 is used to power the model train 120 and the model train accessory 130. In one embodiment of the present invention, the adjustable transformer 140 includes a first input 146 connected to a power source (not shown), a first output 142 connected to the model train track 110, and a second output 144 connected to the model train accessory 130. The adjustable transformer 140 is configured to convert an alternating-current (AC) input received at the first input 146 into first and second AC outputs, which are provided, respectively, via the first and second outputs 142, 144.

The first and second AC outputs are based, respectively, on positions of first and second inputs 148, 150, wherein the first and second inputs are movable between a plurality of positions. For example, a first input 148 may be adjustable between a first position corresponding to zero volts and a last position corresponding to eighteen volts, with a plurality of positions therebetween. It should be appreciated that the plurality of positions on the first and second input devices may either be a plurality of discrete positions (e.g., a second position corresponding to six volts, a third position corresponding to eight volts, etc.), or an infinite number of continuous positions (e.g., allowing continuous, linear (or non-linear) tuning between zero and eighteen volts). It should also be appreciated that the present invention is not limited to an adjustable transformer that includes two outputs. In fact, the present invention is most advantageous if the number of outputs exceeds two. In such an embodiment, first and second inputs 148, 150 can be used to set first and second outputs 142, 144, and third and fourth inputs 152, 154, can be used to set third and fourth outputs (not shown). This would allow the transformer to power and/or control more than two model devices.

Figure 2:
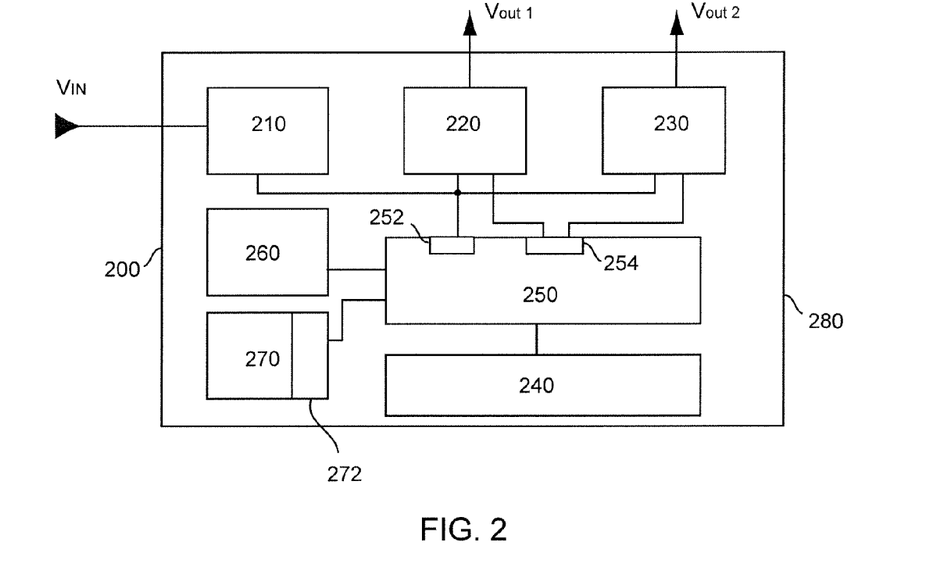
FIG. 2 illustrates a variable transformer in accordance with one embodiment of the present invention.

A variable transformer in accordance with one embodiment of the present invention is shown in FIG. 2. Specifically, the variable transformer 280 includes a fixed transformer 210 for converting a first AC voltage (e.g., 120 volts) into a second AC voltage (e.g., 18 volts), wherein the second AC voltage is provided to a first output drive circuit 220, a second output drive circuit 230, and a processor 250. More particular, the second AC voltage is provided to a power conversion portion 252 of the processor 250. The power conversion portion 252 is used to convert the second AC voltage into at least one direct-current (DC) voltage for running the processor 250 (e.g., positive 12 volts, positive 5 volts, FET bias power, etc.). It should be appreciated that the power conversion portion 250 can either be incorporated into the processor 250, or exist as a separate device, in electrical communication with the processor 250.

The processor 250 is in communication with the first output drive circuit 220, the second output drive circuit 230, a first input 260, and a second input 270. The first and second inputs 260, 270 are movable between a plurality of positions, as discussed above. In a preferred embodiment of the present invention, the second input 270 includes a sensor 272, which is in communication with the processor 250. The sensor 272 is configured to send a signal to the processor 250 if a user is interacting with the second input device 270. For example, the sensor 272 may sense when a user touches the second input device 270, or a handle portion thereof (not shown). By way of another example, the sensor 272 may sense when the second input device 270 has been moved from a first position to a second position. It should be appreciated that the sensor 272 can either be incorporated into the second input device 270, or exist as a separate device, in electrical communication with the processor 250. It should also be appreciated that the sensor 272 is not limited to any particular type of sensor, and includes all types of sensors generally known to those skilled in the art. For example, if the sensor is used to detect a user's touch of the second input device, the sensor may be, for example, a capacitive touch sensor or a resistive touch sensor.

As previously discussed, the processor 250 is configured to communicate with the first and second input devices 260, 270. In particular, the first input device 260 is configured to send a first input signal to the processor 250, and the second input device 270 is configured to send a second input signal to the processor 250, wherein the first and second input signals are based, respectively, on positions of the first and second input devices. For example, if the first input device 260 is set to a position of eighteen volts, then the first input signal should indicate an eighteen volt setting. The processor 250 is then configured to use the first and second input signals to control, respectively, the first and second output drive circuits 220, 240. Specifically, the processor 250 is configured to use the first input signal to generate a first control signal, which is provided (e.g., via output 254) to the first output drive circuit 220, and to use the second input signal to generate a second control signal, which is provided (e.g., via output 254) to the second output drive circuit 230. The first output drive circuit 220 is then configured to convert the second AC voltage into a first output, having a first AC output voltage that corresponds to the first control signal. Similarly, the second output drive circuit 230 is configured to convert the second AC voltage into a second output, having a second AC output voltage that corresponds to the second control signal. It should be appreciated that the present invention is not limited to any particular type of output drive circuit, or control thereof. By way of example, an output drive circuit that is phase controlled, or is configured to receive phase control signals from the processor, is within the spirit and scope of the present invention. By way of another example, an output circuit (e.g., a switching power supply) that is amplitude controlled, or configured to receive amplitude control signals from the processor, is also within the spirit and scope of the present invention.

It should be appreciated that while the foregoing description provides that the first input device is tied to the first output (i.e., the voltage on the first output corresponds to a position of the first input device), and the second input device is tied to the second output (i.e., the voltage on the second output corresponds to a position of the second input device), the present invention is not so limited. For example, in one embodiment of the present invention, the relationships between the inputs and the outputs are not fixed, but are programmable. This can be accomplished, for example, through at least one switch (e.g., on the back of the adjustable transformer), or through another user interface (e.g., an interactive LCD display on the top of the adjustable transformer, an external remote control, etc.).

The processor 250 is further configured to display data concerning the first and second outputs on a display 240. For example, the processor may be configured to display voltage and current of the first and second outputs on the display. In one embodiment of the present invention, the processor is further configured to display a first set of data on the display 240, and to replace the first set of data with a second set of data if a signal is received from the sensor 272, indicating that the user has interacted with the second input device 270. In accordance with this embodiment, the first set of data is voltage and current associated with the first output, and the second set of data is voltage and current associated with the second output. The processor 250 may then be configured to replace the second set of data with the first set of data if the processor 250 has not received a signal from the sensor 272 during a predetermined period of time, indicating that the user is no longer interacting with the second input device 270. In an alternate embodiment of the present invention, the processor 250 may be configured to replace the second set of data with the first set of data if the processor receives a signal from a second sensor (not shown), indicating that the user is interacting with the first input device 260. It should be appreciated that the present invention is not limited to any particular type of display, and includes all types of displays generally known to those skilled in the art. For example, the display 240 may be a digital display (e.g., an LCD display, etc.) or an analog display (e.g., a meter, etc.).

It should also be appreciated that the present invention is not limited to any apparatus that includes the number or type of components shown in FIG. 2. For example, an adjustable transformer that includes additional input devices, additional output drive circuits, or additional components (e.g., a sensor controller, a memory for storing program data for the processor, etc.) is within the spirit and scope of the present invention. Such an adjustable transformer can be seen in FIGS. 7a-c, which includes four input devices, four output driver circuits, and four analog meters, wherein the first meter displays a voltage associated with the first output, the second meter displays a current associated with the first output, the third meter displays a current associated with the fourth output, and the fourth meter displays a voltage associated with the fourth output. If the user interacts with the second input device, the first and second meters are switched, respectively, to display a voltage and a current associated with the second output. Similarly, if the user interacts with the third input device, the third and fourth meters are switched, respectively, to display a current and a voltage associated with the third output.

It should also be appreciated that the adjustable transformer may further include at least one external port (not shown) in communication with the processor. Such a port (e.g., serial communication port, USB port, etc.) can be used to reprogram the processor (or its memory) after the adjustable transformer has been manufactured. The same port (or an alternate port) can also be used to connect the processor to an external device, such as a button box, a wired remote control, or a command base. Such a port would allow a user to send, via the adjustable transformer, additional commands to a model device, such as a command to play sound, generate smoke, adjust speed, etc. Such a feature is particularly useful if the adjustable transformer can be operated in both a "conventional mode" and a "command mode." While such modes of operation are well known to those skilled in the art, and will not be discussed in detail herein, a "conventional mode of operation" (in general) uses a DC voltage superimposed on an AC voltage (e.g., 18 volts at 60 Hz) to control at least one feature of the model device, whereas the "command mode of operation" (in general) uses digital control signals (e.g., a digital data packet, etc.) that are superimposed (e.g., at 455 kHz) on an AC voltage (e.g., 18 volts at 60 Hz) to control at least one feature of the model device.

Figure 8:
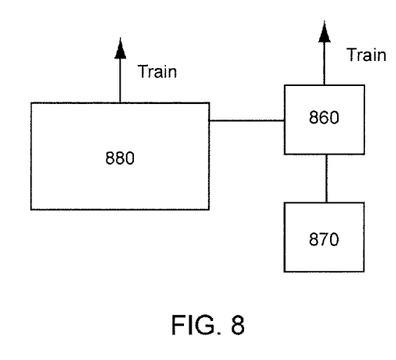
FIG. 8 illustrates a model train system in accordance with another embodiment of the present invention, wherein the model train system includes a model train, a variable transformer, a command base, and a remote control.
Figure 9:
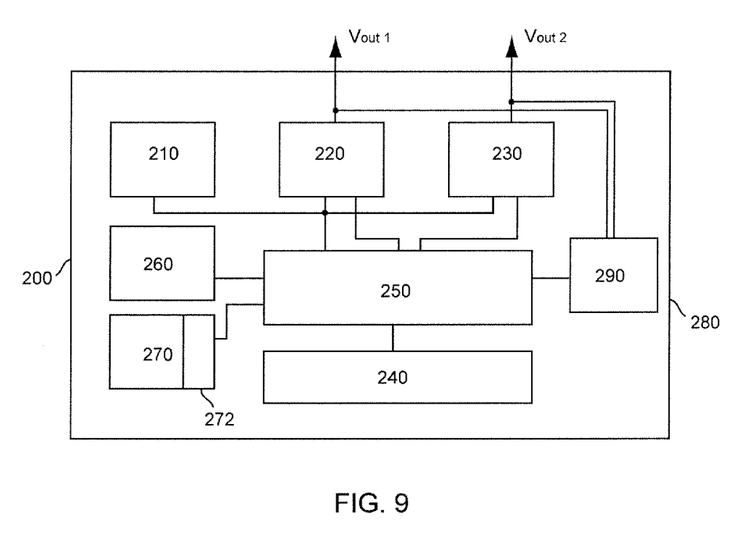
FIG. 9 illustrates a model train system in accordance with another embodiment of the present invention.

Such a feature is shown in FIG. 8, wherein an adjustable transformer (or a processor included therein) 880 is connected to an external command base 860 via a port (not shown) and a model train (not shown), and the command base 860 is connected to a remote control 870 and the model train (not shown). If the user interacts with the remote control to control a feature of the train, a corresponding command is sent to the command base 860, either via a wired or wireless communication path. The command base 860 can then either superimpose the command on the train's AC voltage (e.g., 18 volts at 60 Hz), or provide the command to the adjustable transformer, where it is superimposed on the train's AC voltage (e.g., 18 volts at 60 Hz). For example, as shown in FIG. 9, the adjustable transformer may include a command mode controller 290 that is configured to receive the command (e.g., via a port) (not shown) and superimpose it (e.g., at 455 kHz) onto the train's AC voltage. In an alternate embodiment, the command base can be incorporated into the adjustable transformer by replacing the command mode controller 290 with a command base that is configured to receive a command from a remote control, and to superimpose it (e.g., at 455 kHz) on the train's AC voltage (e.g., 18 volts at 60 Hz). Such a feature would allow a user to interact with a train via a (wired or wireless) remote control by merely switching the adjustable transformer into a "command mode of operation."

It should be appreciated that while switching the adjustable transformer into a "command mode" may result in external commands being superimposed onto an AC output voltage, the input devices can be configured (in a command mode) to perform different functions. For example, in a first configuration, the input devices can be used to set maximum output voltages. By way of example, if the first input device is set to 12 volts, then the processor will ensure that the first AC output voltage does not exceed 12 volts, regardless of any external request to exceed 12 volts. In a second configuration, the input devices can be used to adjust the AC output voltages (like the conventional mode of operation). In a third configuration, the input devices (including any buttons and switches, as discussed below) can be used to generate commands that are then superimposed (e.g., at 455 kHz) onto the AC output voltages. For example, if the first input device is set to 12 volts, then the command mode controller (or the internal command base, if available) may be configured to superimpose a command onto the first AC output voltage, wherein the command corresponds to 12 volts. The command may then be received by the train, and used to provide 12 of the received 18 volts to the motor. It should be appreciated that in this (i.e., the third) configuration, the adjustable transformer may receive a user interaction before placing eighteen voltage (at 60 Hz) on a particular output. The user interaction may be, for example, the flipping a switch, or moving a particular input device into a non-zero position. It should also be appreciated that the particular configuration of the adjustable transformer can either be set at the factory, or selected by the user (e.g., via a switch on the back of the adjustable transformer). It should further be appreciated that if an external device is being used to adjust the AC output voltages, then the processor may be configured to display data on the second output only if the processor detects a signal from the external device indicating that the user would like to adjust the second AC output voltage (e.g., similar to the signal indicating that the user is interacting with the second input device).

It should also be appreciated that the adjustable transformer may further include a receiver (or transceiver) for communicating with a wireless remote control, which can be used to send, via the adjustable transformer, additional commands to a model device.

It should further be appreciated that the adjustable transformer may include at least one external switch in communication (at least indirectly) with the processor. Such a switch can be used by a user, for example, to switch the adjustable transformer between a "conventional mode" and a "command mode," to associate a particular output with a particular model device (e.g., train, accessory, etc.), or to switch the adjustable transformer into a "one to many" mode of operation. The "one-to-many" mode of operation allows a single input device to control a plurality of outputs. For example, a four-output adjustable transformer could be designed so that, in a "one-to-many" mode of operation, a single input device (e.g., the first input device) is used to control two of the four outputs, three of the four outputs, or all four outputs, depending on how the processor is configured and/or the position of the "one-to-many" switch.

Figure 3:
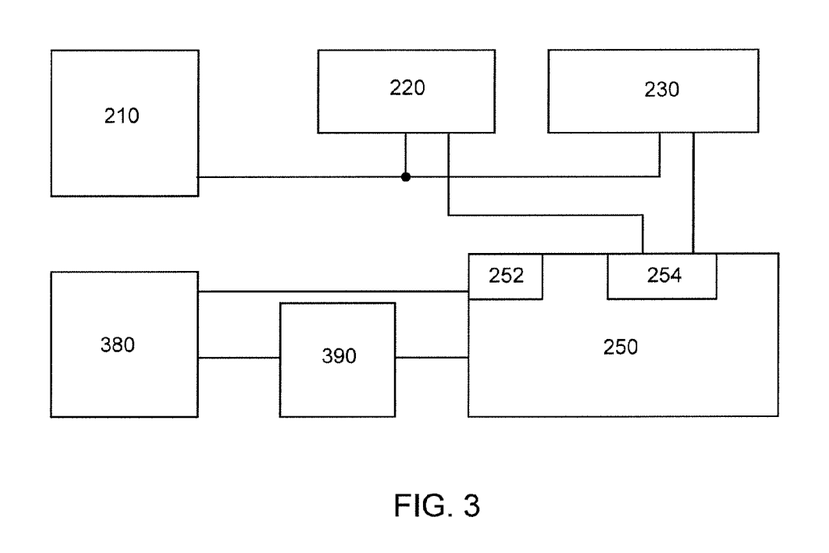
FIG. 3 illustrates a first portion of the variable transformer shown in FIG. 1.
Figure 4:
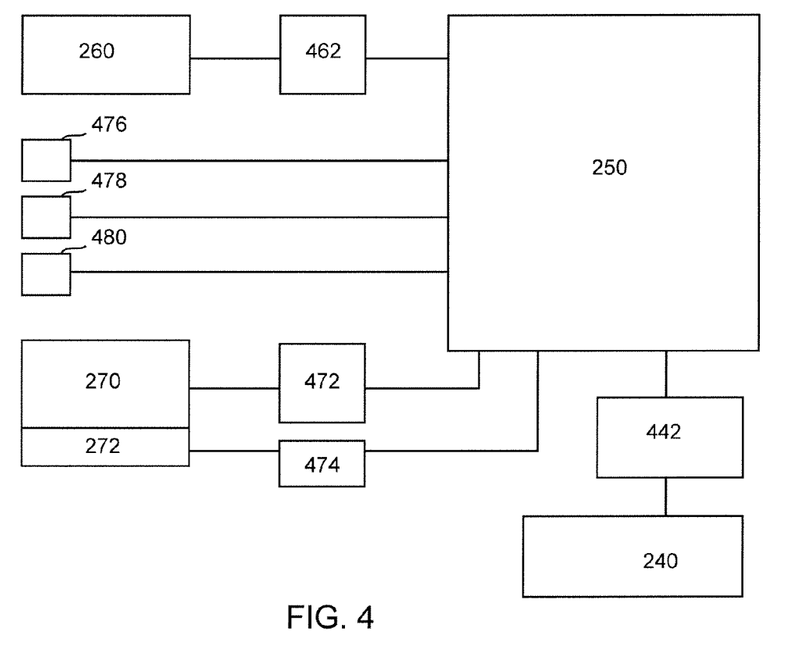
FIG. 4 illustrates a second portion of the variable transformer shown in FIG. 1.
Figure 5:
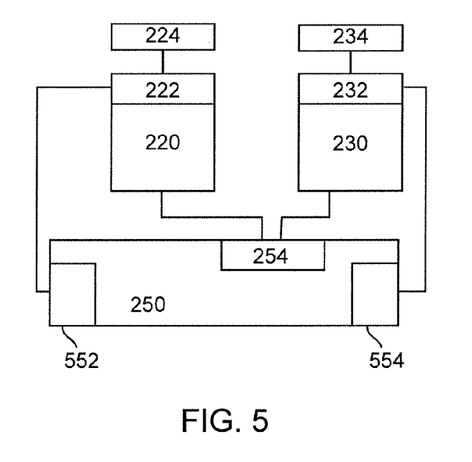
FIG. 5 illustrates a third portion of the variable transformer shown in FIG. 1.

As discussed above, the adjustable transformer may include certain components, in addition to the ones shown in FIG. 2. Such additional components are shown in FIGS. 3-5. Specifically, in FIG. 3, the adjustable transformer further includes a second transformer 380 and a zero-cross detector 390, wherein the second transformer 380 is configured to convert the first AC voltage into a third AC voltage that is in phase with the second AC voltage. The third AC voltage is then feed to the zero-cross detector 390, which generates signals (e.g., zero-cross signals), indicating zero-crossings of the third AC voltage. The signals, or zero-crossings, are then used by the processor 250 to generate the necessary control signals (e.g., phase control signals), which are used by the output drive circuits 220, 230 to generate proper first and second AC output voltages. It should be appreciated that the zero-cross detector could be connected to the first transformer 210, thereby doing away with the second transformer 380. However, by using the second transformer, a voltage (i.e., the third AC voltage) with less noise (i.e., less noise than the second AC voltage) can be provided to the zero-cross detector 390.

In FIG. 4, the adjustable transformer further includes a first input controller 462, which is positioned between the first input device 260 and the processor 250. The first input controller 462 functions to provide the first input signal (i.e., corresponding to the position of the first input device) to the processor 250. A similar controller (i.e., 472) may be positioned between the second input device 270 and the processor 250. Also, a controller 474 (e.g., touch controller) may be positioned between the sensor 272 and the processor 250. If the sensor is a touch sensor, the controller 474 functions to provide a signal to the processor 250 if the user touches the second input device 270. Finally a display controller 442 is positioned between the display 240 and the processor 250. The display controller 442, which is controlled by the processor 250, functions to display data (e.g., identified by the processor) on the display 240. It should be appreciated that the controller 474 and the display controller 442 are dictated, respectively, by the type of sensor 272 used, and the type of display 240 used. For example, if the display is an LCD, then the display controller should be an LCD controller.

As shown in FIG. 4, the adjustable transformer may further include a first button 476 that can be pushed to generate a bell sound on a model train connected to the first output. Specifically, in response to the first button 476 being pressed, the processor 250 is configured to add, either directly or indirectly (e.g., by instructing the first output drive circuit to add), a first DC offset to the first AC output voltage, wherein the first DC offset is either a positive or a negative DC offset. If a model train is connected to the first output, it may be configured to detect the first DC offset, and to generate a bell sound in response thereto. Similarly, the adjustable transformer may further include a second button 478 that can be pushed to generate a whistle sound on a model train connected to the first output. Specifically, in response to the second button 478 being pressed, the processor is configured to add, either directly or indirectly, a second DC offset to the first AC output voltage, wherein the second DC offset is either a positive or a negative DC offset. If a model train is connected to the first output, it may be configured to detect the second DC offset, and to generate a whistle sound in response thereto.

Figure 7A:
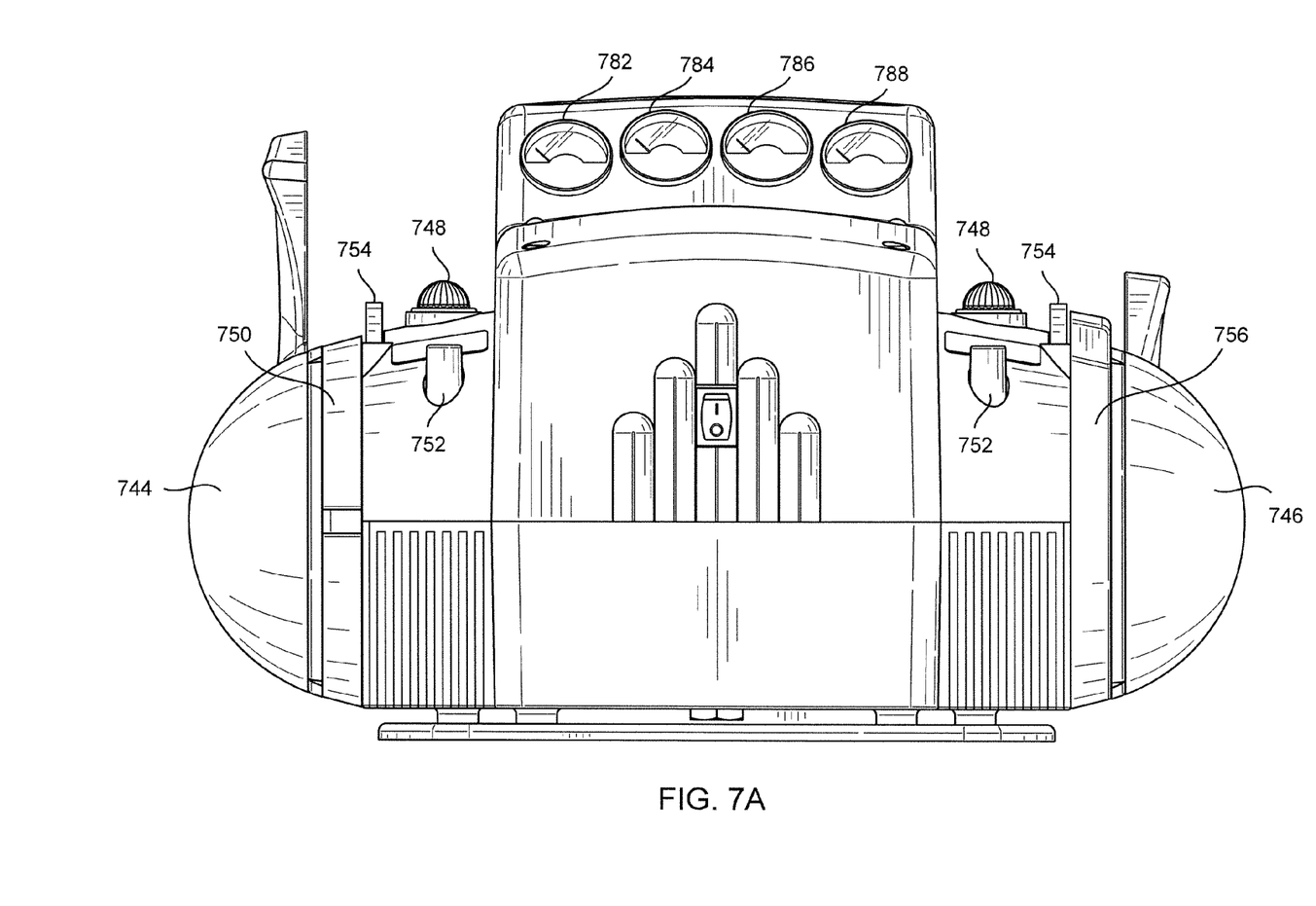
FIGS. 7a-c illustrate a variable transformer in accordance with another embodiment of the present invention.
Figure 7B:
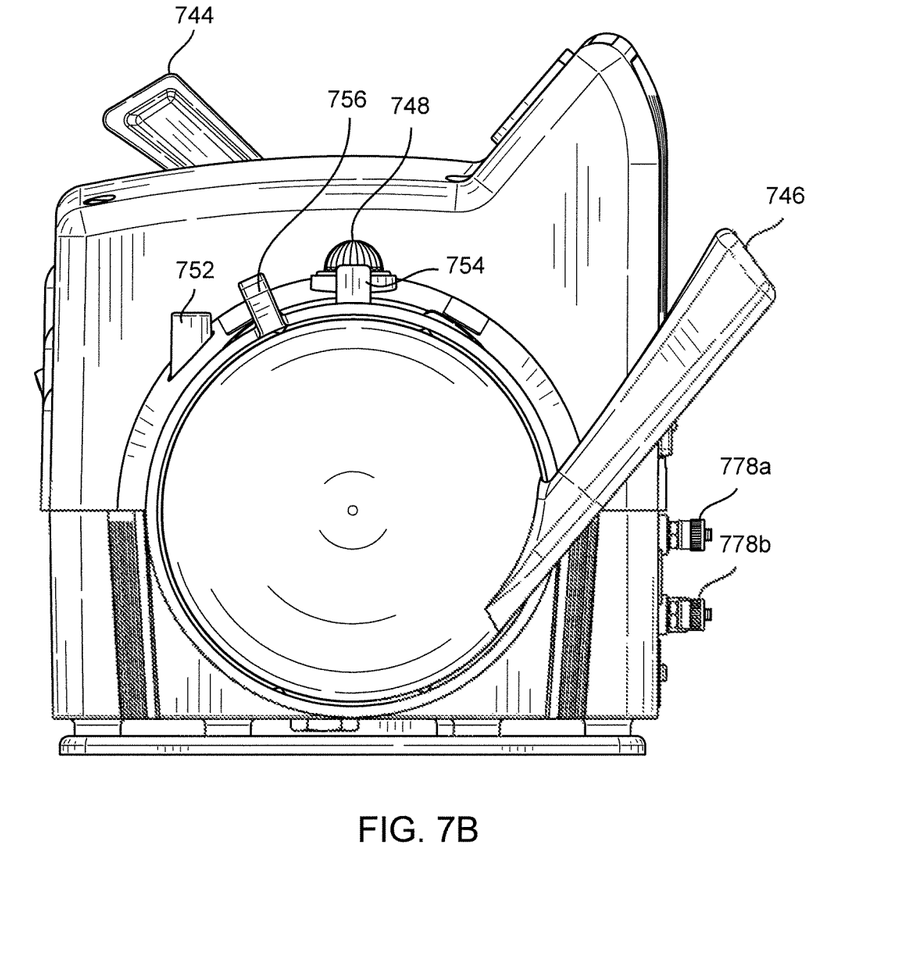
Figure 7C:
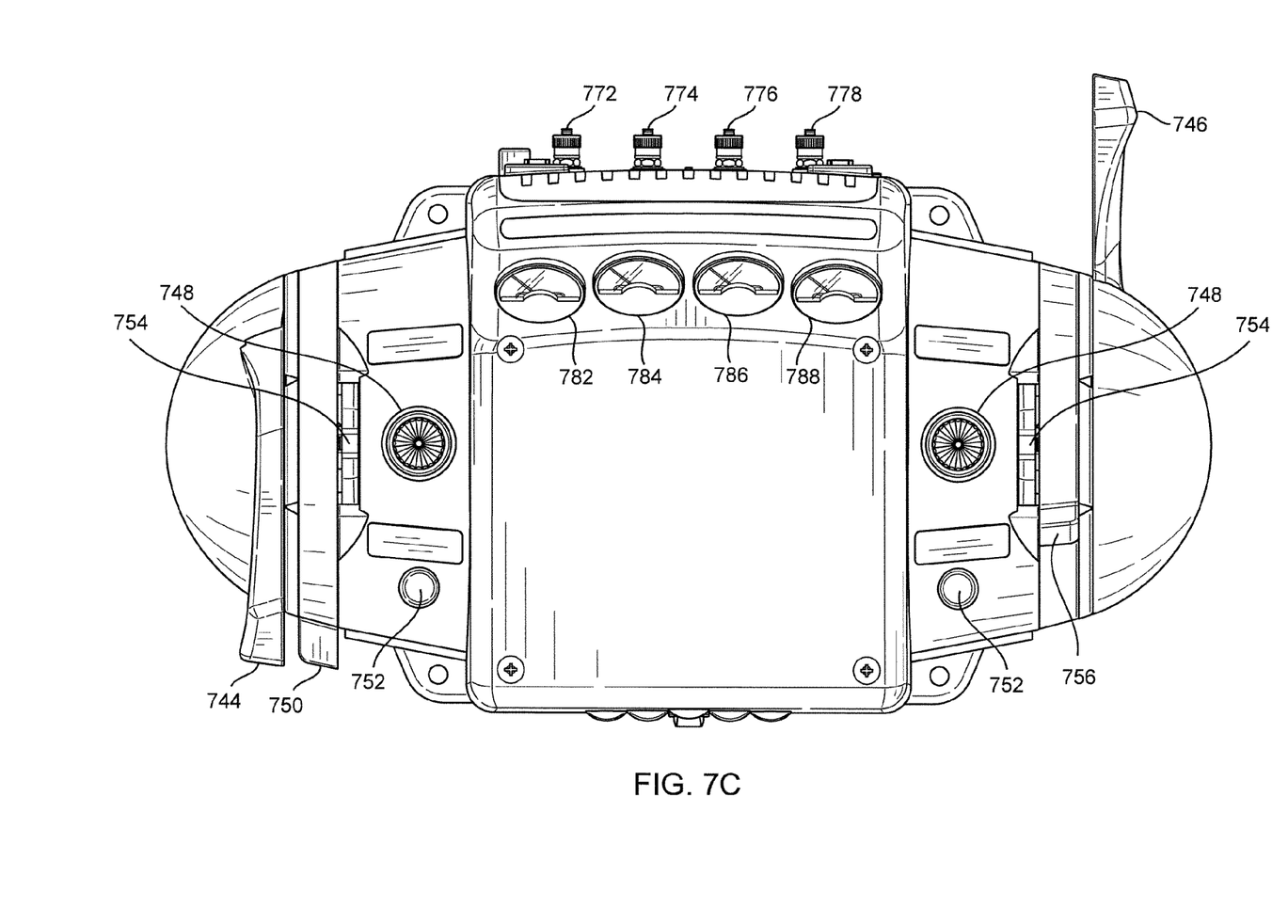

The adjustable transformer may also include a third switch 480 that can be pressed to change a direction of a model train connected to the first output. Specifically, in response to the third button 480 being pressed, the processor is configured to cycle the first output from the first AC output voltage to zero volts, and then from zero volts to the first AC output voltage (referred to herein as a change-direction instruction). If a model train is connected to the first output, it may be configured to detect the change-direction instruction, and to change a transmission or a motor on the model train from a first state to a second state. For example, the change-direction instruction may result in a change from a forward-direction state to a neutral state, from the neutral state to a reverse-direction state, from the reverse-direction state to the neutral state, or from the neutral state to the forward-direction state. The model train may further include a state machine, allowing the train to cycle through the foregoing states, in the order presented herein. It should be appreciated that while three buttons have been described in conjunction with the first output, these buttons (or additional buttons) could also be used in conjunction with a different output (see, e.g., FIGS. 7a-c, showing buttons and switches being used in conjunction with the first and fourth outputs). It should also be appreciated that other types of input devices can be used instead of buttons. For example, a button can be pressed to generate a bell sound, a switch can be moved in a first direction to generate a whistle sound, and the switch can be moved in a second direction to generate a change-direction instruction (see, e.g., FIGS. 7a-c).

As shown in FIG. 5, the adjustable transformer may further include a first current sensor 222 incorporated into (or connected to) the first output drive circuit 220, and a second current sensor 232 incorporated into (or connected to) the second output drive circuit 230. The first current sensor 222 is configured to provide data to the processor 250 (e.g., via current input 552) that can be used to determine a current of the first output, and the second current sensor 232 is configured to provide data to the processor 250 (e.g., via current input 554) that can be used to determine a current of the second output. This allows the processor to display the sensed current on the display, or perform a particular operation if the sensed current exceeds a predetermined threshold (e.g., shut down the output drive circuit, activate an error light, etc.). It should be appreciated that the adjustable transformer or the output drive circuits may further include additional sensors, such as voltage sensors for providing data to the processor that can be used to determine voltages of the first and second outputs. The voltages can then be displayed on the display. Absent voltage sensors, the voltages displayed on the display may represent target voltages, as set by the user via the input devices. It should further be appreciated that the adjustable transformer may further include a plurality of circuit breakers connected to the outputs of the adjustable transformer (e.g., 224, 234). The circuit breakers are designed to trip if the output current exceeds a threshold current (e.g., generally indicating the presence of a short). Preferably, the breakers are accessible to the user (e.g., on the outside of the adjustable transformer) so that the user can reset the breaker if it has been tripped.

Figure 6:
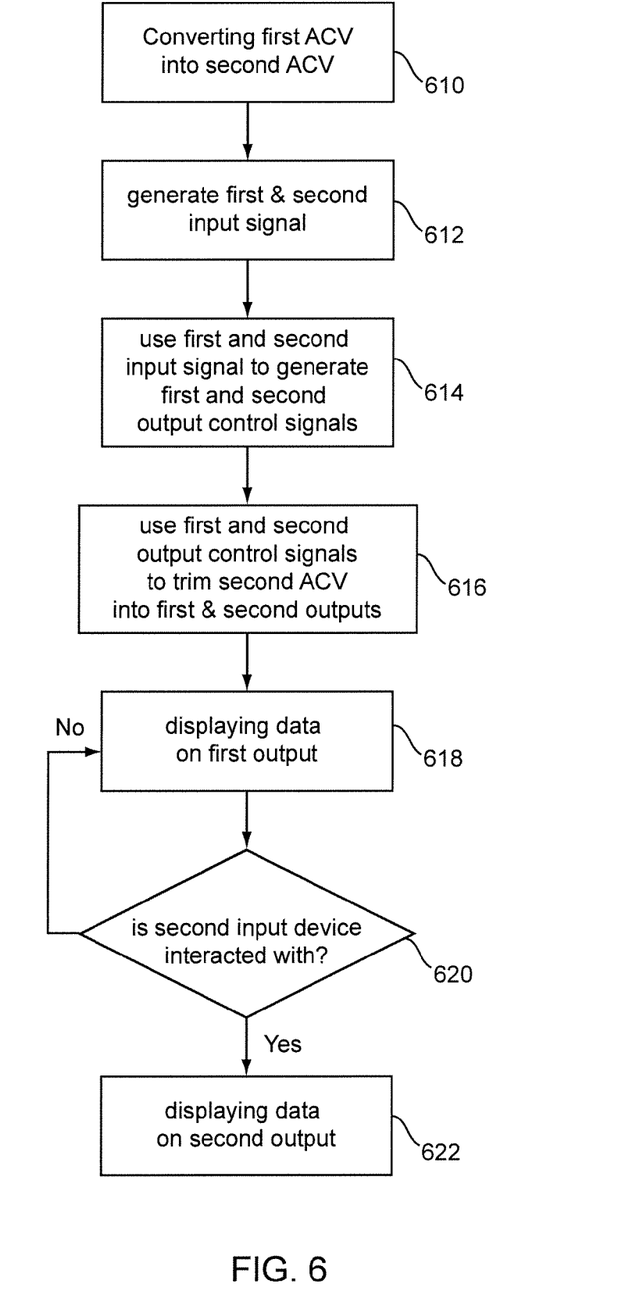
FIG. 6 illustrates a method of providing power to a model train system in accordance with one embodiment of the present invention.

FIG. 6 illustrates a method of providing power to a plurality of model devices in accordance with one embodiment of the present invention. The method starts at step 610, where a first AC voltage is converted into a second AC voltage. Then first and second input signals are generated at step 612. The first and second input signals may be generated, for example, by setting first and second rotatable knobs on an outer surface of the adjustable transformer. The first and second input signals are then used (e.g., by a processor) to generate first and second control signals at step 614. The first and second control signals are then provided at step 616 to first and second output drive circuits, where they are used to convert the second AC voltage into first and second outputs, having a first AC output voltage and a second AC output voltage, respectively. Data concerning the first output is displayed at step 618. It is then determined at step 620 whether a user is interacting with the second input device. If the answer is NO, then data concerning the first output is displayed at step 618. If, however, the answer is YES, then data concerning the second output is displayed at step 622, replacing the data concerning the first output. Once data concerning the second output is displayed, such data is replaced by data concerning the first output if the user does not interact with the second input device for a predetermined period of time, or if the user interacts with the first input device.

An adjustable transformer in accordance with one embodiment of the present invention is shown in FIGS. 7a-c. In particular, the adjustable transformer includes a first input device 744, a second input device 750, a third input device 756, and a fourth input device 746. The adjustable transformer further includes first and second buttons (e.g., 752) for generating a bell sound, first and second switches (e.g., 754) for generating a whistle sound and for generating a change-direction instruction, and a first a second light (e.g., 748), indicating that the adjustable transformer is either operating properly (e.g., a green light), or experiencing an error (e.g., a red light). The functionality of these devices is the same as previously described. For example, the first, second, third and fourth input devices are all rotatable devices, whose positions can be set by a user to correspond to target voltages of the corresponding outputs. These inputs allow a user to power, for example, up to four model trains, four model train accessories, or any combination thereof. By adding sensors to the second and third input devices, four analog meters (e.g., 782-788) can be used to display voltages and currents associated with the first and fourth outputs (e.g., 772, 778), and can be switched to display voltage and currents associated with the second and third outputs (e.g., 774, 776) if the user interacts with the second and third input devices. In other words, data associated with the first output can be replaced by data associated with the second output if the user touches the second input device, and data associated with the fourth output can be replaced by data associated with the third output if the user touches the third input device.

Having thus described several embodiments of a system and method for powering and controlling a plurality of model devices, it should be apparent to those skilled in the art that certain advantages of the system and method have been achieved. It should also be appreciated that various modifications, adaptations, and alternative embodiments thereof may be made within the scope and spirit of the present invention. The invention is solely defined by the following claims.

What is claimed is:

1. An apparatus for powering at least four model devices, the model devices including at least one model vehicle, comprising:

a transformer for converting a first alternating-current (AC) voltage into a second AC voltage;

a first input device for generating a first input signal based on a position of the first input device, the first input device being movable between a plurality of positions;

a second input device for generating a second input signal based on a position of the second input device, the second input device being movable between a plurality of positions;

a third input device for generating a third input signal based on a position of the third input device, the third input device being movable between a plurality of positions;

a fourth input device for generating a fourth input signal based on a position of the fourth input device, the fourth input device being movable between a plurality of positions;

a processor for receiving the first, second, third and fourth input signals from the first, second, third and fourth input devices, respectively, and for generating corresponding first, second, third and fourth output control signals;

a first output drive circuit for receiving the second AC voltage and the first output control signal and for using the first output control signal to convert the second AC voltage into a first output having a first AC output voltage, wherein the first AC output voltage is one of equal to and less than the second AC voltage;

a second output drive circuit for receiving the second AC voltage and the second output control signal and for using the second output control signal to convert the second AC voltage into a second output having a second AC output voltage, wherein the second AC output voltage is one of equal to and less than the second AC voltage;

a third output drive circuit for receiving the second AC voltage and the third output control signal and for using the third output control signal to convert the second AC voltage into a third output having a third AC output voltage, wherein the third AC output voltage is one of equal to and less than the second AC voltage;

a fourth output drive circuit for receiving the second AC voltage and the fourth output control signal and for using the fourth output control signal to convert the second AC voltage into a fourth output having a fourth AC output voltage, wherein the fourth AC output voltage is one of equal to and less than the second AC voltage;

a first sensor in communication with the second input device and the processor;

a second sensor in communication with the third input device and the processor;

a first set of displays in communication with the processor and for displaying the first AC voltage and a current of the first output; and a second set of displays in communication with the processor and for displaying the fourth AC voltage and a current of the fourth output;

wherein the processor is configured to display the second AC voltage and a current of the second output on the first set of displays only if the processor receives a signal from the first sensor indicating that the user is interacting with the second input device, the processor is configured to display the third AC voltage and a current of the third output on the second set of displays only if the processor receives a signal from the second sensor indicating that the user is interacting with the third input device.

2. The apparatus of claim 1, wherein the first sensor generates a signal if the second input device is touched by the user, and the second sensor generates a signal if the third input device is touched by the user.

3. The apparatus of claim 2, wherein the first and second sensors are capacitive touch sensors.

4. The apparatus of claim 1, wherein, if the user interacts with the second input device, the processor is further configured to replace the displayed second AC voltage with the first AC voltage and replace the displayed current of the second output with the current of the first output if the first sensor does not generate a signal within a predetermined period of time, indicating that the user is no longer interacting with the second input device, and if the user interacts with the third input device, the processor is further configured to replace the displayed third AC voltage with the fourth AC voltage and replace the displayed current of the third output with the current of the fourth output if the second sensor does not generate a signal within the predetermined period of time, indicating that the user is no longer interacting with the third input device.

5. The apparatus of claim 1, further comprising first and second buttons, wherein the processor is configured to add a first direct-current (DC) offset to the first output if the first button is pressed, and add the first DC offset to the fourth output if the second button is pressed, wherein the first DC offset is used to play a bell sound in at least one of the plurality of model devices.

6. The apparatus of claim 5, further comprising first and second switches, wherein the processor is configured to add a second DC offset to the first output if the first switch is pressed in a first direction, and add the second DC offset to the fourth output if the second switch is pressed in the first direction, wherein the second DC offset is used to play a whistle sound in at least one of the plurality of model devices.

7. The apparatus of claim 6, wherein the processor is configured to send a change-direction instruction over the first output if the first switch is pressed in a second direction, and send a change-direction instruction over the fourth output if the second switch is pressed in the second direction, wherein the change-direction instruction is used to switch at least one of the plurality of model devices from a forward-direction state to a neutral state, from the neutral state to a backward-direction state, from the backward-direction state to the neutral state, and from the neutral state to the forward-direction state.

8. The apparatus of claim 1, wherein the second input device includes a dial portion and a handle portion, wherein the handle portion includes the capacitive touch sensor.

9. The apparatus of claim 1, wherein the first sensor generates the signal from the first sensor if the second input device is moved from a first position to a second position.

10. The apparatus of claim 1, further comprising a third sensor in communication with the first input device and the processor, wherein the processor is further configured to display the first AC voltage and a current of the first output on the first set of displays if the processor receives a signal from the third sensor indicating that the user is interacting with the first input device.

11. The apparatus of claim 1, further comprising the plurality of model devices, wherein the first AC output voltage is electrically connected to a first one of the plurality of model devices and the second A/C output voltage is electrically connected to a second one of the plurality of model devices.

12. The apparatus of claim 11, further comprising a fifth input device for providing a fifth input signal to the processor in response to the fifth input device being manipulated by the user, wherein (i) the processor sends a change-direction instruction to the first one of the plurality of model devices in response to receiving the fifth input signal, and (ii) the first one of the plurality of model devices is configured to switch one of a transmission and an engine in the first one of the plurality of model devices from a forward-direction state to a neutral state in response to receiving the change-direction instruction.

13. The apparatus of claim 12, wherein the processor communicates the change-direction instruction to the first one of the plurality of model devices by cycling the first output from the first AC output voltage to zero volts, and then from zero volts to the first AC output voltage.

14. The apparatus of claim 13, wherein the first one of the plurality of model devices is further configured to (i) switch one of the transmission and the engine from the neutral state to a reverse-direction state in response to receiving a second change-direction instruction, (ii) switch one of the transmission and the engine from the reverse-direction state to the neutral state in response to receiving a third change-direction instruction, and (iii) switch one of the transmission and the engine from the neutral state to the forward-direction state in response to receiving a fourth change-direction instruction.

* * * * *